United States Patent
Hwang

(10) Patent No.: US 10,603,981 B2
(45) Date of Patent: Mar. 31, 2020

(54) VEHICULAR SPEAKER TEMPERATURE CONTROL DEVICE, CONTROL METHOD THEREOF, AND VEHICLE INCLUDING DEVICE

(71) Applicants: Hyundai Motor Company, Seoul (KR); Kia Motors Corporation, Seoul (KR)

(72) Inventor: Yong Hwan Hwang, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/204,152

(22) Filed: Nov. 29, 2018

(65) Prior Publication Data

US 2020/0039320 A1 Feb. 6, 2020

(30) Foreign Application Priority Data

Aug. 6, 2018 (KR) .................. 10-2018-0091160

(51) Int. Cl.
*B60H 1/00* (2006.01)
*H04R 29/00* (2006.01)
*H04R 3/00* (2006.01)

(52) U.S. Cl.
CPC ......... *B60H 1/00735* (2013.01); *H04R 3/007* (2013.01); *H04R 29/001* (2013.01); *H04R 2499/13* (2013.01)

(58) Field of Classification Search
CPC .. B60H 1/00735; H04R 3/007; H04R 29/001; H04R 2499/13
See application file for complete search history.

(56) References Cited

U.S. PATENT DOCUMENTS 3,980,841 A * 9/1976 Okamura ................. H04R 7/12
181/294
2017/0105068 A1 4/2017 Lesso
(Continued)

FOREIGN PATENT DOCUMENTS

JP 2001-189993 A 7/2001
JP 2003-125480 A 4/2003
(Continued)

*Primary Examiner* — Andrew L Sniezek
(74) *Attorney, Agent, or Firm* — Mintz Levin Cohn Ferris Glovsky and Popeo, P.C.; Peter F. Corless

(57) ABSTRACT

A vehicular speaker temperature control device may include: a sensing unit configured to sense a temperature of a vehicle; an amplifier unit configured to amplify a sound of the vehicle; a speaker unit connected to the amplifier unit and configured to output the amplified sound; and a controller in operable communication with the sensing unit and the amplifier unit. The controller may receive a current temperature of the vehicle measured by the sensing unit, to determine whether the current temperature of the vehicle is less than or equal to a preset reference temperature, and when the current temperature of the vehicle is less than or equal to the preset reference temperature, to control operation of the amplifier unit so as to cause an increase in temperature of the speaker unit by applying a driving signal of a specific frequency to the speaker unit.

19 Claims, 12 Drawing Sheets

(56) References Cited

U.S. PATENT DOCUMENTS

2018/0261069 A1* 9/2018 Honey-Jones ... G08B 13/19697
2018/0367897 A1* 12/2018 Bjork ....................... G01K 7/16
2019/0068152 A1* 2/2019 Gautama ................. H04R 3/04
2019/0222923 A1* 7/2019 Niidera ................... H04R 9/06

FOREIGN PATENT DOCUMENTS

| JP | 2003-244788 A | 8/2003 |
| JP | 2017-188634 A | 10/2017 |
| KR | 10-2009-0041585 A | 4/2009 |
| KR | 10-2016-0052133 A | 5/2016 |

* cited by examiner

FIG. 10

| TEMPERATURE DIFFERENCE | DRIVING FREQUENCY | DRIVING TIME |
|---|---|---|
| 1 | 10Hz | 1s |
| 2 | 10Hz | 3s |
| 3 | 10Hz | 6s |
| 4 | 10Hz | 10s |
| 5 | 10Hz | 20s |
| ⋮ | ⋮ | ⋮ |

VEHICULAR SPEAKER TEMPERATURE CONTROL DEVICE, CONTROL METHOD THEREOF, AND VEHICLE INCLUDING DEVICE

CROSS-REFERENCE TO RELATED APPLICATION

This application claims the benefit of priority to Korean Patent Application No. 10-2018-0091160, filed on Aug. 6, 2018 in the Korean Intellectual Property Office, the entire contents of which are hereby incorporated by reference as if fully set forth herein.

BACKGROUND OF THE DISCLOSURE

Technical Field

The present disclosure relates to a vehicular speaker temperature control device, and more particularly, to a vehicular speaker temperature control device, a control method thereof, and a vehicle including the vehicular speaker temperature control device.

Discussion of the Related Art

In general, a vehicle multimedia system, such as an audio system, a car stereo system, or a navigation device, is capable of outputting sound through a speaker installed in the vehicle. The speaker may include a unit for reproducing sound, which may be classified into various unit types such as a low/high-note unit (2 ways) for reproducing low and high notes in all bands, a low/intermediate/high-note unit (3 ways) for reproducing low, intermediate, and high notes, a 4-way unit that further includes a unit for reproducing a super high note, or the like.

In the case of a luxury car, for example, a speaker may be disposed at a specific location to appropriately output a frequency in low/intermediate/high note bands. A tweeter (high note) speaker may be installed as a center speaker of a vehicle, and a midrange (low and intermediate notes) speaker may be installed as dashboard and door speakers.

However, in contrast with a general home speaker, vehicular speakers may be significantly affected by the environment and space in which the vehicle is positioned. In particular, the low-band sound quality of vehicular speakers often deteriorates at low temperatures (e.g., −5° C. or less). This can result from an edge of the vehicular speaker which is hardened to increase its resonance frequency at low temperature.

The lowest resonance frequency of a vehicular speaker can be determined by its edge and damper. Q-factor is another important performance parameter of many vehicular speakers. Particularly, the modulus of elasticity of the edge and the damping coefficient of the damper are a function of temperature and, thus, in a super-low temperature environment, numerical values of the lowest resonance frequency and the Q-factor are increased due to hardening of the edge and the damper.

As such, increase in the numerical values of the lowest resonance frequency and the Q-factor due to the hardening of the edge and the damper has been identified as a major cause for reduction in performance of vehicular speakers. Accordingly, there is a need for a vehicular speaker temperature control device capable of maintaining the temperature of a speaker at room temperature even in a super-low temperature environment to ensure the performance and reliability of the speaker.

SUMMARY OF THE DISCLOSURE

An object of the present disclosure is to provide a vehicular speaker temperature control device, a control method thereof, and a vehicle including the device, for applying a driving signal of a specific frequency to a speaker unit to increase temperature of the speaker unit when internal temperature of the vehicle or internal temperature of a vehicular speaker is less than or equal to a preset reference temperature, thereby ensuring the performance and reliability of the speaker.

Another object of the present disclosure is to provide a vehicular speaker temperature control device, a control method thereof, and a vehicle including the device, for applying a driving signal of a specific frequency to a speaker unit to increase temperature of the speaker unit when internal temperature of the vehicle and internal temperature of a vehicular speaker is less than or equal to a preset reference temperature, thereby accurately and precisely ensuring the performance and reliability of the speaker.

Another object of the present disclosure is to provide a vehicular speaker temperature control device, a control method thereof, and a vehicle including the device, for applying a driving signal of a specific frequency to a speaker unit to increase temperature of the speaker unit when internal temperature of the vehicle is less than or equal to a preset reference temperature, for terminating application of the driving signal of the specific frequency to the speaker unit when the temperature of the vehicular speaker is greater than the preset reference temperature, thereby minimizing power consumption as well as accurately and precisely ensuring the performance and reliability of the speaker.

Another object of the present disclosure is to provide a vehicular speaker temperature control device, a control method thereof, and a vehicle including the device, for measuring the current temperature of the vehicle to minimize power consumption based on temperature sensing when the vehicular door is open.

Another object of the present disclosure is to provide a vehicular speaker temperature control device, a control method thereof, and a vehicle including the device, for applying a driving signal to a speaker unit using an information table including a driving frequency and driving time corresponding to a temperature difference between the measured current temperature and the reference temperature, thereby increasing speaker temperature control speed and minimizing a temperature control time.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

In accordance with embodiments of the disclosure, a vehicular speaker temperature control device may include: a sensing unit configured to sense a temperature of a vehicle; an amplifier unit configured to amplify a sound of the vehicle; a speaker unit connected to the amplifier unit and configured to output the amplified sound; and a controller in operable communication with the sensing unit and the amplifier unit. The controller may receive a current temperature of the vehicle measured by the sensing unit, to determine whether the current temperature of the vehicle is less than or equal to a preset reference temperature, and when the current temperature of the vehicle is less than or equal to the preset reference temperature, to control operation of the amplifier unit so as to cause an increase in temperature of the speaker unit by applying a driving signal of a specific frequency to the speaker unit.

The sensing unit may include a temperature sensor installed in the vehicle that is configured to sense an internal temperature of the vehicle.

When determining whether the current temperature of the vehicle is less than or equal to the preset reference temperature, the controller may receive the a current internal temperature of the vehicle measured by the temperature sensor, and compare the current internal temperature of the vehicle with the preset reference temperature to determine whether the current internal temperature of the vehicle is less than or equal to the preset reference temperature.

The sensing unit may include a temperature sensor installed in the speaker unit that is configured to sense an internal temperature of the speaker unit.

When determining whether the current temperature of the vehicle is less than or equal to the preset reference temperature, the controller may receive a current internal temperature of the speaker unit measured by the temperature sensor, and compare the current internal temperature of the speaker unit with the preset reference temperature to determine whether the current internal temperature of the speaker unit is less than or equal to the preset reference temperature.

The sensing unit may include a first temperature sensor installed in the vehicle that is configured to sense an internal temperature of the vehicle; and a second temperature sensor installed in the speaker unit of the vehicle that is configured to sense an internal temperature of the speaker unit.

When determining whether the current temperature of the vehicle is less than or equal to the preset reference temperature, the controller may receive a current internal temperature of the speaker unit measured by the first temperature sensor, and compare the current internal temperature of the speaker unit with the preset first reference temperature to determine whether the current internal temperature of the speaker unit is less than or equal to the preset first reference temperature.

When the current internal temperature of the vehicle is less than or equal to the preset first reference temperature, the controller may receive the current internal temperature of the speaker unit measured by the second temperature sensor, and compare the current internal temperature of the speaker unit with the preset second reference temperature to determine whether the current internal temperature of the speaker unit is less than or equal to the preset second reference temperature.

The controller may determine whether a door of the vehicle is open, and control operation of the sensing unit so as to measure the current temperature of the vehicle when the door is open.

The preset reference temperature may correspond to room temperature.

When controlling operation of the amplifier unit, the controller may calculate a temperature difference between the current temperature of the vehicle and the preset reference temperature when the current temperature of the vehicle is less than or equal to the preset reference temperature, extract a driving frequency and driving time corresponding to the calculated temperature difference, to generate a driving signal based on the extracted driving frequency and driving time, and control the operation of the amplifier unit by applying the generated driving signal to the speaker unit.

The driving frequency may be a frequency other than an audio frequency band.

The speaker unit may include: a frame forming an outer appearance of the speaker unit; a voice coil configured to generate heat upon receiving a driving signal from the amplifier unit; a cone paper connected to the voice coil and disposed at a location in the frame spaced apart therefrom at a constant interval; an edge connecting the cone paper to an end of the frame; and a damper connecting the frame to the voice coil.

The speaker unit may further include a temperature sensor that is electrically connected to the damper and the edge and configured to sense a temperature of the damper and the edge.

When heat is generated in the voice coil, the speaker unit may transmit the generated heat to the damper and to the edge.

When determining whether the current temperature of the vehicle is less than or equal to the preset reference temperature, the controller may control the operation of the amplifier unit so as to prevent the driving signal of the specific frequency from being applied to the speaker unit when the current temperature of the vehicle is greater than the preset reference temperature.

Furthermore, in accordance with embodiments of the present disclosure, a vehicular speaker temperature control method may include: detecting, by a controller, whether a door of a vehicle is in an open state or a closed state; when the door is in the open state, measuring, by a sensing unit, a current internal temperature of the vehicle; determining, by the controller, whether the current internal temperature of the vehicle is less than or equal to a preset reference temperature; and when the current internal temperature of the vehicle is less than or equal to the preset reference temperature, controlling, by the controller, operation of an amplifier unit so as to cause an increase in temperature of a speaker unit connected to the amplifier unit by applying a driving signal of a specific frequency to the speaker unit.

The method may further include: when the current internal temperature of the vehicle is less than or equal to the preset reference temperature, calculating, by the controller, a temperature difference between the current internal temperature of the vehicle and the preset reference temperature; extracting, by the controller, a driving frequency and driving time corresponding to the calculated temperature difference; generating, by the controller, a driving signal based on the extracted driving frequency and driving time; and controlling, by the controller, the operation of the amplifier unit by applying the generated driving signal to the speaker unit.

Furthermore, in accordance with embodiments of the present disclosure, a vehicular speaker temperature control method may include: detecting, by a controller, whether a door of a vehicle is in an open state or a closed state; when the door is in the open state, measuring, by a sensing unit, an internal temperature of the speaker unit; determining, by the controller, whether the internal temperature of the speaker unit is less than or equal to preset reference temperature; when the internal temperature of the speaker unit is less than or equal to the preset reference temperature, controlling, by the controller, operation of an amplifier unit so as to cause an increase in temperature of a speaker unit connected to the amplifier unit by applying a driving signal of a specific frequency to the speaker unit; measuring, by the sensing unit, an internal temperature of the speaker unit; determining, by the controller, whether the internal temperature of the speaker unit is greater than the preset reference temperature; and when the internal temperature of the speaker unit is greater than the preset reference temperature, preventing, by the controller, the driving signal of the specific frequency from being applied to the speaker unit.

Furthermore, in accordance with embodiments of the present disclosure, a vehicular speaker temperature control method may include: detecting, by a controller, whether a door of a vehicle is in an open state or a closed state; when the door is in the open state, measuring, by a sensing unit, a current internal temperature of the vehicle; determining, by the controller, whether the current internal temperature of the vehicle is less than or equal to a preset reference temperature; when the current internal temperature of the vehicle is less than or equal to the preset reference temperature, controlling, by the controller, operation of an amplifier unit so as to cause an increase in temperature of a speaker unit connected to the amplifier unit by applying a driving signal of a specific frequency to the speaker unit; measuring, by the sensing unit, an internal temperature of the speaker unit; determining, by the controller, whether the internal temperature of the speaker unit is greater than the preset reference temperature; and when the internal temperature of the speaker unit is greater than the preset reference temperature, preventing, by the controller, the driving signal of the specific frequency from being applied to the speaker unit.

The method may further include: when the current internal temperature of the vehicle is less than or equal to the preset reference temperature, calculating, by the controller, a temperature difference between the current internal temperature of the vehicle and the preset reference temperature; extracting, by the controller, a driving frequency and driving time corresponding to the calculated temperature difference; generating, by the controller, a driving signal based on the extracted driving frequency and driving time; and controlling, by the controller, the operation of the amplifier unit by applying the generated driving signal to the speaker unit.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 10 is a diagram showing a driving signal information table according to the embodiment of FIG. 9;

Figure 1:
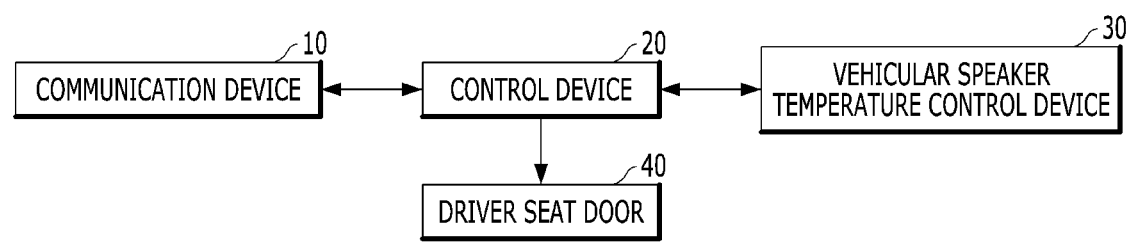
FIG. 1 is a schematic block structural diagram for explanation of a vehicular speaker temperature control device according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Exemplary embodiments of the present disclosure are described in detail so as for those of ordinary skill in the art to easily implement the disclosure with reference to the accompanying drawings. However, the present disclosure may be implemented in various different forms and is not limited to these embodiments. To clearly describe the present disclosure, parts unrelated to the description are omitted in the drawings, and like reference numerals in the specification denote like elements.

Throughout the specification, one of ordinary skill would understand terms "include", "comprise", and "have" to be interpreted by default as inclusive or open rather than exclusive or closed unless expressly defined to the contrary. Further, terms such as "unit", "module", etc. disclosed in the specification mean units for processing at least one function or operation, which may be implemented by hardware, software, or a combination thereof.

Throughout the specification, when a certain part "includes" a certain component, this indicates that the part may further include another component instead of excluding another component unless there is no different disclosure. The same reference numbers will be used throughout the drawings to refer to the same parts.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, a vehicular speaker temperature control device, a control method thereof, and a vehicle including the device, applicable to embodiments of the present disclosure, are described in detail with reference to FIGS. 1 to 12.

Figure 2:
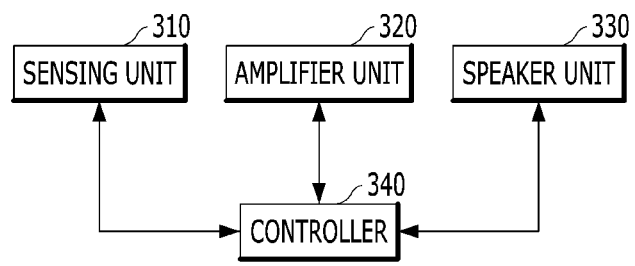
FIG. 2 is a block structural diagram showing a structure of the vehicular speaker temperature control device of FIG. 1.

FIG. 1 is a schematic block structural diagram for explanation of a vehicular speaker temperature control device according to embodiments of the present disclosure. FIG. 2 is a block structural diagram showing a structure of the vehicular speaker temperature control device of FIG. 1.

As shown in FIG. 1, the vehicle according to the present disclosure may include a communication device 10, a control device 20, and a vehicular speaker temperature control device 30.

Here, the communication device 10 may receive a door open signal from an external smart key.

The control device 20 may control a door 40 of the vehicle to be open in response to the door open signal received from the communication device 10.

Then, upon verifying that the door 40 of the vehicle is open, the vehicular speaker temperature control device 30 may control speaker temperature depending on temperature of the vehicle.

Here, as shown in FIG. 2, the vehicular speaker temperature control device 30 may include a sensing unit 310 for sensing temperature of the vehicle, an amplifier unit 320 for amplifying sound of the vehicle, a speaker unit 330 connected to the amplifier unit 320 to output the amplified sound, and a controller 340 connected to the sensing unit 310 and the amplifier unit 320 to communicate therewith.

In this case, upon determining that the door 40 of the vehicle is open, the controller 340 may control the sensing unit 310 to measure current temperature of the vehicle, may determine whether the measured current temperature of the vehicle is less than or equal to preset reference temperature and, when the measured current temperature of the vehicle is less than or equal to the preset reference temperature, the controller 340 may apply a driving signal of a specific frequency to the speaker unit 330 and may control the amplifier unit 320 to increase temperature of the speaker unit 330.

According to embodiments of the present disclosure, the sensing unit 310 may include a temperature sensor installed inside the vehicle to sense internal temperature of the vehicle.

Here, when determining whether the measured current temperature of the vehicle is less than or equal to the preset reference temperature, the controller 340 may receive the measured current internal temperature of the vehicle from the temperature sensor and may compare the received current internal temperature of the vehicle and the preset reference temperature to determine whether the current internal temperature of the vehicle is less than or equal to the preset reference temperature.

In addition, the sensing unit 310 may include a temperature sensor installed inside the speaker unit 330 of the vehicle to sense internal temperature of the speaker unit 330.

Here, the temperature sensor for sensing internal temperature of the speaker unit 330 may be electrically connected to at least one of the edge and the damper of the speaker unit 330 to measure temperature of at least one of the edge and the damper of the speaker unit 330.

In this case, when determining whether the measured current temperature of the vehicle is less than or equal to the preset reference temperature, the controller 340 may receive the measured current internal temperature from the temperature sensor and may compare the received current internal temperature of the speaker unit 330 and the preset reference temperature to determine whether the current internal temperature of the speaker unit 330 is less than or equal to the preset reference temperature.

Furthermore, the sensing unit 310 may include a first temperature sensor installed in the vehicle to sense internal temperature of the vehicle and a second temperature sensor installed inside the speaker unit 330 of the vehicle to sense internal temperature of the speaker unit 330.

Here, the second temperature sensor may be electrically connected to at least one of the edge and the damper of the speaker unit 330 to measure temperature of at least one of the edge and the damper of the speaker unit 330.

In this case, when determining whether the measured current temperature of the vehicle is less than or equal to the preset reference temperature, the controller 340 may receive the measured current internal temperature of the vehicle from the first temperature sensor and may compare the received current internal temperature of the vehicle and preset first reference temperature to determine whether the current internal temperature of the vehicle is less than or equal to the preset first reference temperature and, when the current internal temperature of the vehicle is less than or equal to the preset first reference temperature, the controller 340 may receive the measured current internal temperature of the speaker unit 330 from the second temperature sensor and may compare the received current internal temperature of the speaker unit 330 and preset second reference temperature to determine whether the current internal temperature of the speaker unit 330 is less than or equal to the preset second reference temperature.

For example, the first and second reference temperatures may be different and, in this case, the second reference temperature may be lower than the first reference temperature.

As necessary, the first and second reference temperatures may be the same.

Two temperature sensors may be used because both current internal temperature of the vehicle and current internal temperature of the speaker unit 330 are measured to prevent speaker temperature control error due to a malfunction of a temperature sensor and to enhance reliability corresponding to speaker temperature control.

When determining whether the measured current temperature of the vehicle is less than or equal to the preset reference temperature, the controller 340 may receive the measured current internal temperature of the vehicle from the first temperature sensor and may compare the received current internal temperature of the vehicle and the preset first reference temperature to determine whether the current internal temperature of the vehicle is less than or equal to the preset first reference temperature, when applying a driving signal of a specific frequency to the speaker unit 330 during control of an amplifier unit, the controller 340 may receive the measured current internal temperature of the speaker unit 330 from the second temperature sensor and may compare the received current internal temperature of the speaker unit 330 and the preset second reference temperature to determine whether the current internal temperature of the speaker unit 330 is greater than the preset second reference temperature and, when the current internal temperature of the speaker unit 330 is greater than the preset second reference temperature, the controller 340 may control the amplifier unit 320 to terminate application of the driving signal.

Here, the first and second reference temperatures may be the same.

As necessary, the first and second reference temperatures may be different and, in this case, the second reference temperature may be lower than the first reference temperature.

That is, application of the driving signal to the speaker unit 330 may be terminated when the current internal temperature of the speaker is greater than the preset second reference temperature because application of the driving signal is terminated to minimize power consumption when the current temperature is increased to temperature at which the speaker is stabilized in a low-frequency band.

In addition, the sensing unit 310 may include a door sensor installed in a vehicle door to sense opening and closing of the vehicle door.

Here, upon receiving the door open signal of the vehicle from the door sensor, the controller 340 may control the sensing unit 310 to measure the current temperature of the vehicle.

In this case, upon receiving the door open signal of the vehicle, the controller 340 may be connected to the door sensor to communicate therewith and to perform CAN communication and may receive the door open signal via CAN communication.

The controller 340 may be connected to the sensing unit 310 and the amplifier unit 320 to communicate therewith and to perform CAN communication, may receive current temperature of the vehicle from the sensing unit 310 via CAN communication, and may transmit a control signal for driving the speaker unit 330 via CAN communication.

Then, when controlling the sensing unit 310 to measure the current temperature of the vehicle, the controller 340 may detect whether the vehicle door is open and may control the sensing unit 310 to measure the current temperature of the vehicle when the vehicle door is open.

Here, when detecting whether the vehicle door is open, the controller 340 may detect whether a door of a driver seat among vehicle doors is open.

This is because the possibility that the speaker is driven by operating a multimedia system of the vehicle by a driver is high.

Accordingly, when a door at a driver seat is open, the controller 340 may sense temperature of a vehicle prior to a multimedia operation of the vehicle and may control speaker temperature to prevent sound quality of the speaker from being degraded at low temperature, thereby enhancing speaker performance based on the multimedia operation.

As necessary, when detecting whether a vehicular door is open, the controller 340 may control a door sensor installed in the vehicular door to sense whether the vehicular door is open or closed and may receive a measured door open signal from the door sensor to detect whether the vehicular door is open.

As another case, when controlling the sensing unit 310 to measure current temperature of the vehicle, upon receiving a door open signal from an external smart key, the controller 340 may control the vehicular door to be open in response to the received door open signal and, simultaneously, may control the sensing unit 310 to measure the current temperature of the vehicle.

When determining whether the measured current temperature of the vehicle is less than or equal to predetermined reference temperature, the controller 340 may determine whether the measured current temperature of the vehicle is less than or equal to room temperature when reference temperature is preset to room temperature.

For example, room temperature may be any one temperature in the range of about 10 degrees to about 30 degrees but is not limited thereto.

When controlling the amplifier unit 320, the controller 340 may compare the measured current temperature of the vehicle and the preset reference temperature to calculate a temperature difference between the current and the reference temperature when the measured current temperature of the vehicle is less than or equal to the preset reference temperature, may extract a driving frequency and driving time corresponding to the calculated temperature difference, and may also control the amplifier unit 320 to generate a driving signal based on the extracted driving frequency and driving time and to apply the driving signal to the speaker unit 330.

Here, the vehicular speaker temperature control device 30 according to the present disclosure may further include a memory unit for storing an information table including the driving frequency and driving time corresponding to the calculated temperature difference between the current temperature and the reference temperature.

In this case, when extracting the driving frequency and driving time corresponding to the calculated temperature difference, the controller 340 may extract the driving frequency driving time corresponding to the temperature difference from the information table of the memory unit.

For example, the driving time may be increased as the temperature difference is increased and, the driving frequency may be equal as the temperature difference is increased.

Here, the driving frequency may be a frequency other than an audio frequency band.

This needs to be satisfied to prevent the driving frequency from being heard by a driver according to speaker temperature control.

For example, the driving frequency may any one of a frequency in the range of about 1 Hz to about 20 Hz and a frequency equal to or greater than about 20 kHz but is not limited thereto.

Then, the speaker unit 330 may include a frame that forms an outer appearance of the speaker unit 330, a voice coil that generates heat upon receiving a driving signal from the amplifier unit 320, a cone paper connected to the voice coil and disposed in the frame to be spaced apart therefrom at a constant interval, an edge for connection between the cone paper and an end of the frame, and a damper for connection between the frame and the voice coil.

Here, when the voice coil generates heat, the speaker unit 330 may transmit the generated heat to the damper connected to the voice coil and may transmit the heat to the edge along the cone paper connected to the voice coil.

The speaker unit 330 may further include a temperature sensor that is electrically connected to the damper and the edge to sense temperature of the damper and the edge.

Here, the controller 340 may control the amplifier unit 320 based on the temperature of the damper and the edge, sensed by the temperature sensor, to apply or block the driving signal to the speaker unit 330.

For example, when the temperature of the damper and the edge, sensed by the temperature sensor, is less than or equal to the reference temperature, the controller 340 may control the amplifier unit 320 to apply the driving signal to the speaker unit 330.

When the temperature of the damper and the edge, sensed by the temperature sensor, is greater than the reference temperature, the controller 340 may control the amplifier unit 320 to block the driving signal to the speaker unit 330.

Then, when determining whether the measured current temperature of the vehicle is less than or equal to the preset reference temperature, the controller 340 may control the amplifier unit 320 to block application of the driving signal of a specific frequency to the speaker unit 330 when the measured current temperature of the vehicle is not less than or equal to the preset reference temperature.

As such, according to the present disclosure, when internal temperature of the vehicle or internal temperature of the vehicular speaker is less than or equal to the preset temperature, a driving signal of a specific frequency may be applied to a speaker unit to increase temperature of the speaker unit, thereby ensuring the performance and reliability of the speaker.

According to the present disclosure, when internal temperature of the vehicle and internal temperature of the vehicular speaker are less than or equal to the preset temperature, a driving signal of a specific frequency may be applied to a speaker unit to increase temperature of the speaker unit, thereby accurately and precisely ensuring the performance and reliability of the speaker.

According to the present disclosure, when internal temperature of the vehicle is less than or equal to the preset reference temperature, a driving signal of a specific frequency may be applied to a speaker unit to increase temperature of the speaker unit and, when temperature of the vehicular speaker is greater than the preset reference temperature, application of the driving signal of the specific frequency to the speaker unit may be terminated and, thus, the performance and reliability of the speaker may be accurately and precisely ensured and power consumption may also be minimized.

According to the present disclosure, the current temperature of a vehicle may be measured when a vehicular door is open and, thus, power consumption based on temperature sensing may be minimized.

In addition, according to the present disclosure, a driving signal may be applied to a speaker unit using an information table including a driving frequency and driving time corresponding to a temperature difference between the measured current temperature and the reference temperature and, thus, speaker temperature control speed may be increased and a temperature control time may be minimized.

Figure 3:
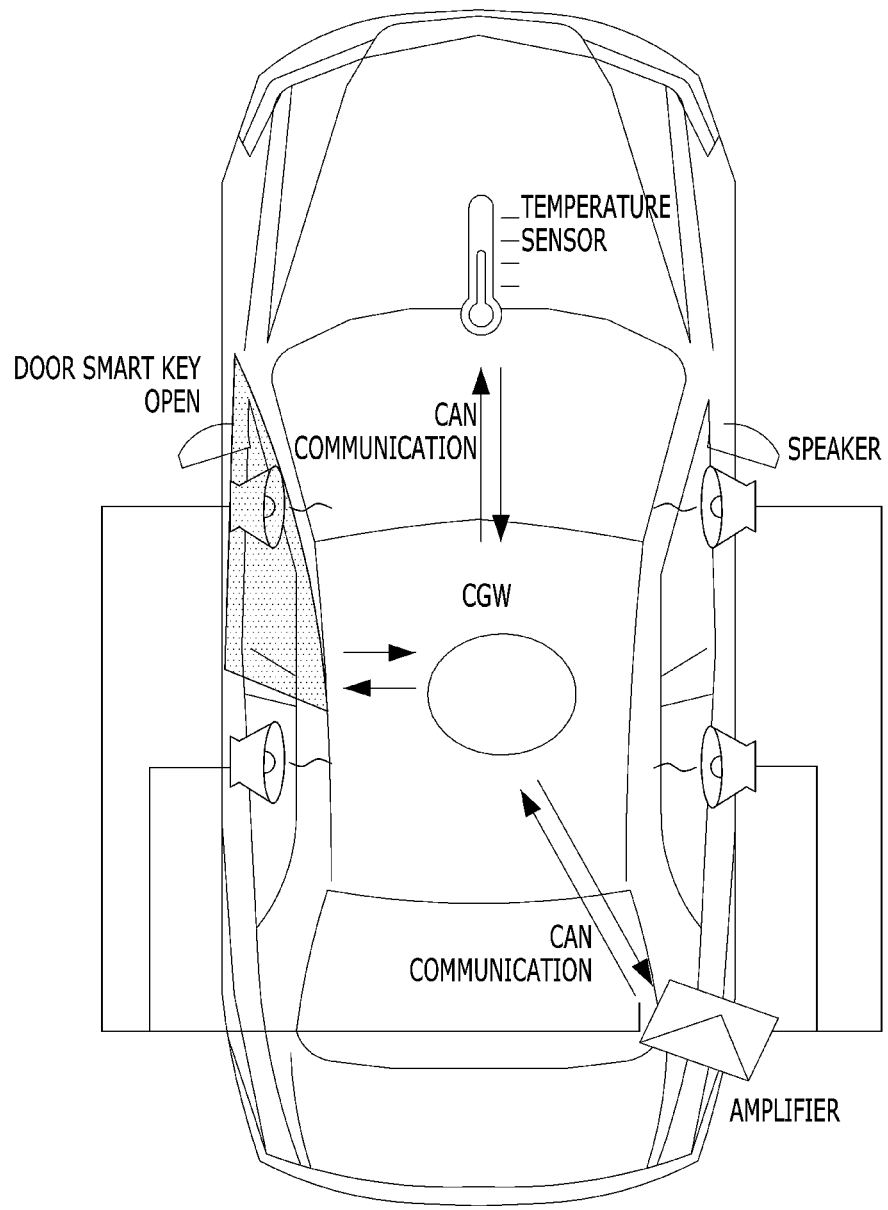
FIG. 3 is a diagram for explanation of vehicular speaker temperature control depending on opening of a vehicular door.

FIG. 3 is a diagram for explanation of vehicular speaker temperature control depending on opening of a vehicular door.

As shown in FIG. 3, the vehicular speaker temperature control device according to the present disclosure may control temperature of the speaker depending on temperature of the vehicle upon detecting that the vehicle is open.

Here, the vehicular speaker temperature control device may include a sensing unit including a temperature sensor for sensing temperature of the vehicle, an amplifier unit including an amplifier for amplifying sound of the vehicle, a speaker unit including a plurality of speakers connected to the amplifier to output the amplified sound, and a controller connected to the temperature sensor, the amplifier, and the vehicular door to communicate therewith.

For example, the temperature sensor, the amplifier, the vehicular door, and the controller may be connected to communicate with each other based on a central gate way (CGW).

The CGW may be a network device for transmitting various sensor signals measured in the vehicle to a controller at a desired position.

The speaker may be connected to an external amplifier and may be connected to an output channel and a speaker of an internally or externally installed amplifier in an analog manner.

The CGW and the amplifier may be connected to communicate with each other and, in this case, an internally or externally installed amplifier may communicate with the CGW to receive information on internal temperature of the vehicle, information on whether a smart key is operated, information on opening of a door of a driver seat, and so on.

In addition, the number and positions of speakers may be changed depending on the type and option of a vehicle, and a type and position of an internally or externally installed amplifier may be changed depending on the type and option of the vehicle.

Then, the controller may control temperature sensing to measure the current temperature of the vehicle upon detecting that the vehicular door is open, may determine whether the measured current temperature of the vehicle is less than or equal to preset reference temperature and, when the measured current temperature of the vehicle is less than or equal to the preset reference temperature, the controller may apply a driving signal of a specific frequency to a speaker and may control the amplifier to increase temperature of the speaker.

Here, the temperature sensor may be installed in the vehicle to sense internal temperature of the vehicle and, in this case, the controller may receive the measured internal temperature of the vehicle from the temperature sensor and may compare the received internal temperature of the vehicle and the preset reference temperature to determine whether the internal temperature of the vehicle is less than or equal to the preset reference temperature.

As necessary, the temperature sensor may be installed in the vehicular speaker to sense internal temperature of the speaker and, in this regard, may be electrically connected to at least one of an edge and a damper of the speaker to measure temperature of at least one of the edge and the damper of the speaker.

In this case, the controller may receive measured current internal temperature of the speaker, from the temperature sensor, and may compare the received current internal temperature of the speaker and the preset reference temperature to determine whether the current internal temperature of the speaker is less than or equal to the preset reference temperature.

As another case, the temperature sensor may include a first temperature sensor installed in the vehicle to sense internal temperature of the vehicle and a second temperature sensor installed in the vehicular speaker to sense internal temperature of the speaker and, in this case, the second temperature sensor may be electrically connected to at least one of the edge and the damper of the speaker to measure temperature of at least one of the edge and the damper of the speaker.

In this case, the controller may receive the measured current internal temperature of the vehicle, from the first temperature sensor, and may compare the received current internal temperature of the vehicle and the preset first reference temperature to determine whether the internal temperature of the vehicle is less than or equal to the preset first reference temperature and, when the current internal temperature of the vehicle is less than or equal to the preset first reference temperature, the controller may receive the measured internal temperature of the speaker, from the second temperature sensor, and may compare the received internal temperature of the speaker and the preset second reference temperature to determine whether the internal temperature of the speaker is less than or equal to the preset second reference temperature.

When determining whether the measured current temperature of the vehicle is less than or equal to the preset reference temperature, the controller may receive the measured internal temperature of the vehicle, from the first temperature sensor and may compare the received current internal temperature of the vehicle and the preset first reference temperature to determine whether the current internal temperature of the vehicle is less than or equal to the preset first reference temperature, during control of the amplifier, the controller may receive the measured current internal temperature of the speaker, from the second temperature sensor, when receiving the measured current internal temperature of the speaker, from the second temperature sensor, and may compare the received current internal temperature of the speaker and the preset second reference temperature to determine whether the current internal temperature of the speaker is greater than the preset second reference temperature and, when the current internal temperature of the speaker is greater than the preset second reference temperature, the controller may control the amplifier to terminate application of a driving signal.

In addition, upon receiving a door open signal of the vehicle from the door sensor, the controller may control the temperature sensor to measure the current temperature of the vehicle.

In this case, when receiving the door open signal of the vehicle, the controller may be connected to the door sensor to communicate therewith and to perform CAN communication and may receive the door open signal via CAN communication.

As such, the controller may be connected to the temperature sensor and the amplifier to communicate therewith and to perform CAN communication, may receive the current temperature of the vehicle from the temperature sensor via CAN communication, and may transmit a control signal for driving the speaker to the amplifier via CAN communication.

As necessary, the controller may detect that the vehicular door is open and, when the vehicular door is open, the controller may control the temperature sensor to measure the current temperature of the vehicle.

As another case, the controller may control the door sensor installed in the vehicular door to sense whether the vehicular door is open or closed and may receive the measured door open signal from the door sensor to detect whether the vehicular door is open.

As another case, upon receiving the door open signal from an external smart key, the controller may control the vehicular door to be open in response to the received door open signal and, simultaneously, may control the temperature sensor to measure the current temperature of the vehicle.

Figure 4:
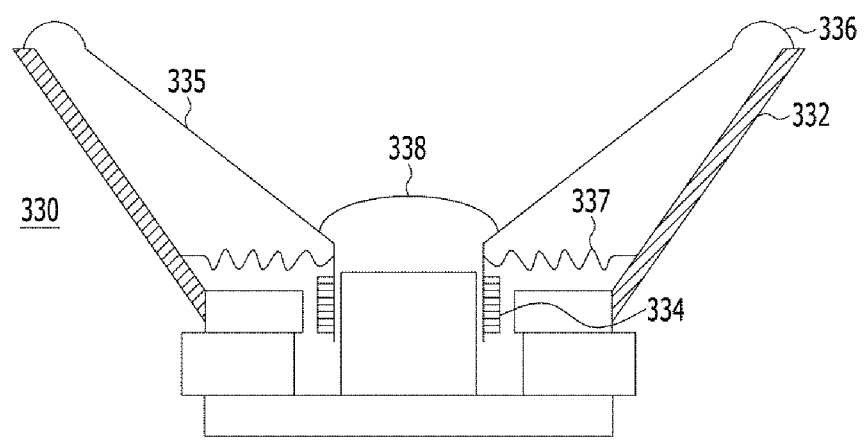
FIG. 4 is a schematic cross-sectional view of the speaker unit of FIG. 2.
Figure 5:
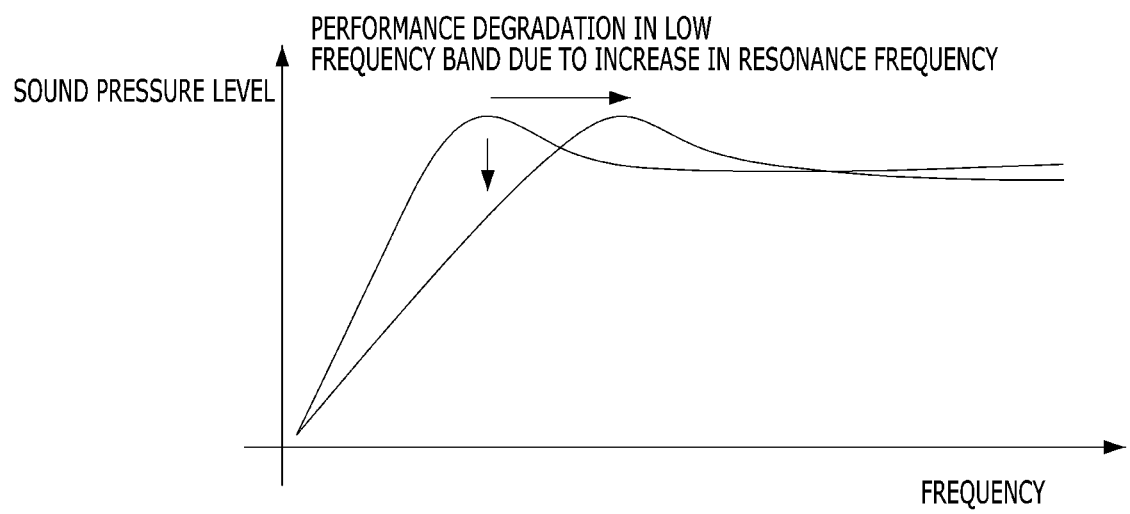
FIGS. 5 and 6 are graphs for explanation of the low-band frequency characteristic of a speaker unit.
Figure 6:
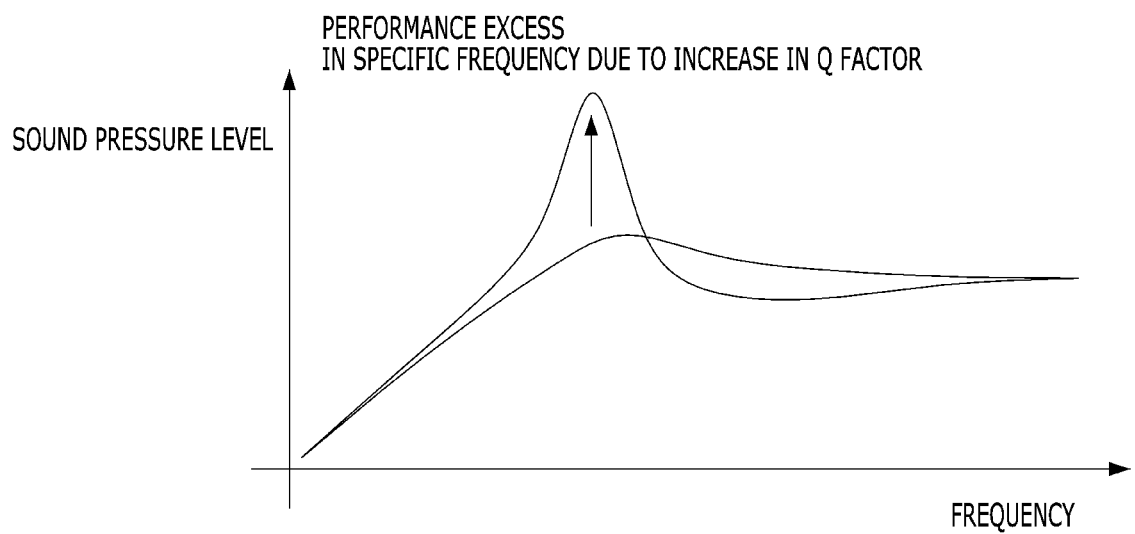

FIG. 4 is a schematic cross-sectional view of the speaker unit of FIG. 2. FIGS. 5 and 6 are graphs for explanation of the low-band frequency characteristic of a speaker unit.

As shown in FIG. 4, the speaker unit 330 may include a frame 332 that forms an outer appearance of the speaker unit 330, a voice coil 334 that generates heat upon receiving a driving signal, a cone paper 335 connected to the voice coil 334 and disposed in the frame 332 to be spaced apart therefrom at a constant interval, an edge 336 for connection between the cone paper 335 and an end of the frame 332, and a damper 337 for connection between the frame 332 and the voice coil 334.

As such, the edge 336 and the damper 337 among components of the speaker unit 330 may be parameters for determining a lowest resonance frequency and a Q-factor as one important performance parameter of a speaker.

Here, the modulus of elasticity of the edge 336 and the damping coefficient of the damper 337 are a function of temperature and, thus, in a super-low temperature environment, the edge 336 and the damper 337 may be hardened.

As such, increase in the numerical values of the lowest resonance frequency and the Q-factor due to the hardening of the edge 336 and the damper 337 has been pointed out as the major cause for reduction in performance of the vehicular speaker.

Accordingly, according to the present disclosure, temperature of the speaker may be increased in a super-low temperature to maintain the modulus of elasticity of the edge 336 and damping coefficient of the damper 337 at room temperature, enhancing the performance and reliability of the speaker.

As shown in FIG. 5, the modulus of elasticity of the edge may be increase as temperature is lowered and, accordingly, a resonance frequency may be increased to degrade the performance of the speaker in a low frequency region.

As shown in FIG. 6, the damper 337 may not perform energy dissipation as temperature is lowered and, thus, the Q-factor may be changed to degrade the performance of the speaker in a resonance frequency.

Figure 7:
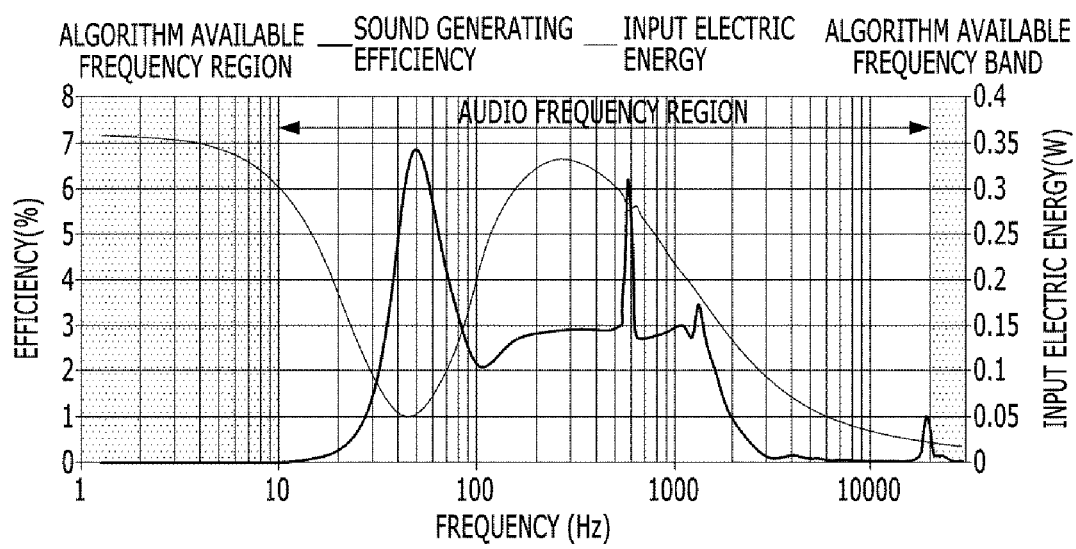
FIG. 7 is a graph for explanation of a driving frequency band applied to a speaker unit.
Figure 8:
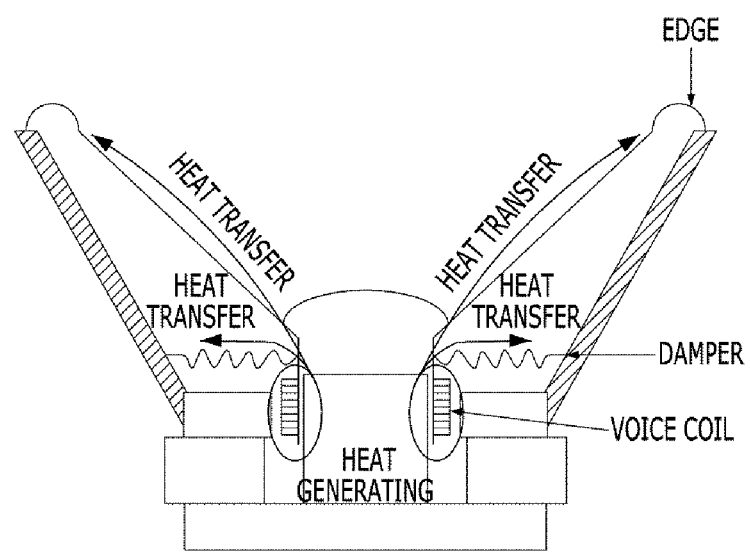
FIG. 8 is a graph for explanation of a heat transfer procedure along with increase in temperature of a speaker unit.

FIG. 7 is a graph for explanation of a driving frequency band applied to a speaker unit. FIG. 8 is a graph for explanation of a heat transfer procedure along with increase in temperature of a speaker unit.

As shown in FIG. 7, sound generating efficiency of a speaker may be indicated as a ratio of input electric energy and generated sound energy.

For example, when the speaker is driven using input electric energy of about 1 W applied to the speaker with sound generating efficiency of about 10%, only input electric energy of about 0.1 W may be converted into sound and the remaining input electric energy of about 0.9 W may be generated as heat.

Accordingly, although, in general, sound generating efficiency needs to be increased, the sound generating efficiency may be lowered and a driving signal for maximizing heat generation to a speaker to control temperature of the speaker, according to the present disclosure.

Here, according to the present disclosure, a driving frequency of a driving signal as a driving signal for control of temperature of the speaker may be set to a region other than an audio frequency band.

This needs to be satisfied to prevent sound generated from the speaker from being heard by a driver since the driving frequency of the driving signal is the region other than the audio frequency band during application of the driving signal for control of temperature of the speaker to the speaker.

For example, the driving frequency may any one of a frequency in the range of about 1 Hz to about 20 Hz and a frequency equal to or greater than about 20 kHz but is not limited thereto.

In an available frequency region of the driving signal for control of temperature of the speaker, when sound generating efficiency is low, heat generated by a voice coil may be increased as input electric energy is increased.

That is, when a driving signal of a frequency of about 1 Hz to about 10 Hz is applied to the speaker, sound of the speaker may be minimized and a heating value may be maximized.

As shown in FIG. 8, heat generated by the voice coil may be transferred to the damper and the edge, and the damper and the edge may be increased to target temperature that is set to a target.

Since the speaker has different characteristic curves depending on a speaker type, driving frequencies of driving signals for temperature control, to be used for respective speakers, may be different and, there is a need to pre-measure the driving frequencies to realize measured data in the form of an information table and to pre-store the information table in a memory unit.

For example, according to the present disclosure, the driving frequency and the driving time may be extracted from the information table of the memory unit in response to the temperature difference between the measured internal temperature of the vehicle and the reference temperature.

For example, the driving time may be increased as a temperature difference is increased and the driving frequency may be the same as the temperature difference is increased.

Figure 9:
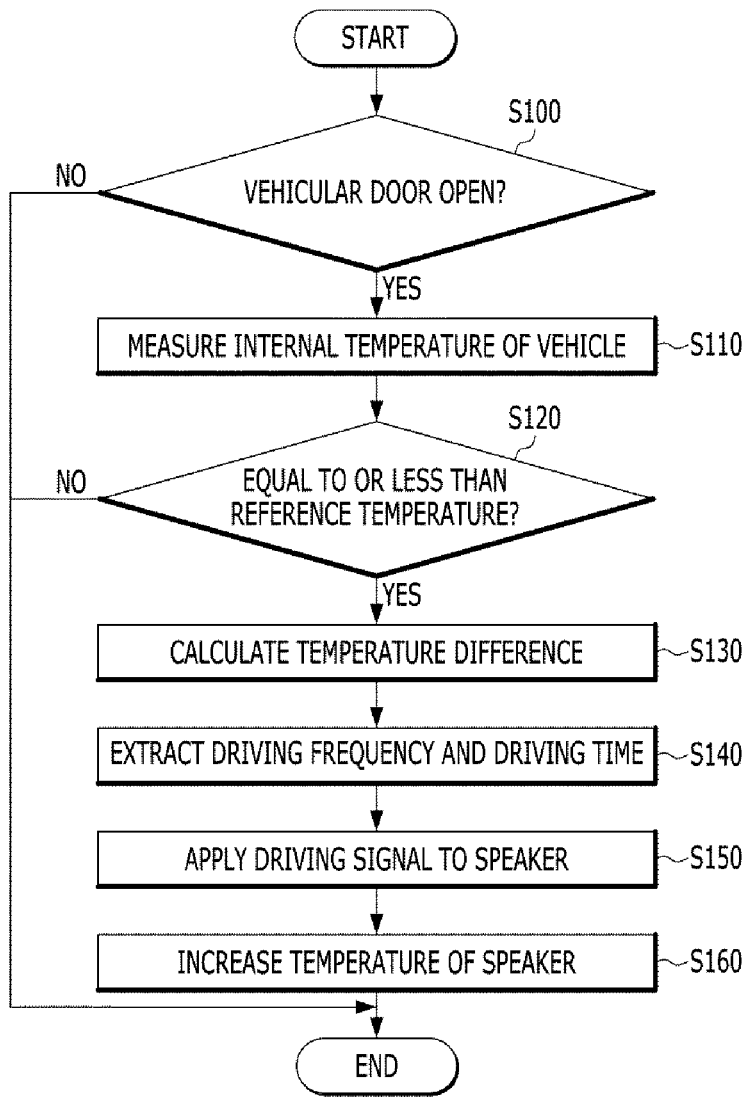
FIG. 9 is a flowchart for explanation of a method of controlling vehicular speaker temperature according to a first embodiment of the present disclosure.

FIG. 9 is a flowchart for explanation of a method of controlling vehicular speaker temperature according to a first embodiment of the present disclosure. FIG. 10 is a diagram showing a driving signal information table according to the embodiment of FIG. 9.

As shown in FIGS. 9 and 10, a vehicular speaker temperature control device according to the present disclosure may first detect opening and closing states of a vehicular door (S100).

Then, when the vehicular door is in the opening state, the vehicular speaker temperature control device may measure current internal temperature of the vehicle (S110).

Then, the vehicular speaker temperature control device may determine whether the measured current internal temperature of the vehicle is less than or equal to preset reference temperature (S120).

Here, the reference temperature may be room temperature and, in this case, the room temperature may be any one temperature in the range of about 10 degrees to about 30 degrees but is not limited thereto.

In addition, when the measured current internal temperature of the vehicle is less than or equal to the preset reference temperature, the vehicular speaker temperature control device may apply a driving signal of a specific frequency to a speaker unit to enhance temperature of the speaker unit.

Here, an operation of increasing the temperature of the speaker unit may be performed via the following detailed operations.

When the measured current internal temperature of the vehicle is less than or equal to the preset reference temperature, the vehicular speaker temperature control device may calculate a temperature difference between the current internal temperature of the vehicle and the reference temperature (S130).

Then, the vehicular speaker temperature control device may extract a driving frequency and driving time corresponding to the calculated temperature difference (S140).

Then, the vehicular speaker temperature control device may apply a driving signal corresponding to the extracted driving frequency to the speaker unit for the extracted driving time (S150) to increase the temperature of the speaker unit (S160).

Here, the extracted driving time may be increased as the calculated temperature difference is increased and, the extracted driving frequency may be the same irrespective of a size of the calculated temperature difference.

For example, the extracted driving frequency may be any one of a frequency in the range of about 1 Hz to about 20 Hz and a frequency equal to or greater than about 20 kHz.

As shown in FIG. 10, the vehicular speaker temperature control device according to the present disclosure may extract the driving frequency and driving time corresponding to the temperature difference from the information table stored in the memory unit during extraction of the driving frequency and driving time corresponding to the calculated temperature difference.

Here, the information table may include the driving frequency and driving time corresponding to the temperature difference between the current temperature and the reference temperature.

For example, the driving time may be increased as the temperature difference is increased and the driving frequency may be the same as the temperature difference is increased.

Here, the driving frequency may be a frequency other than an audio frequency band.

This needs to be satisfied to prevent the driving frequency from being heard by a driver according to speaker temperature control.

For example, the driving frequency may any one of a frequency in the range of about 1 Hz to about 20 Hz and a frequency equal to or greater than about 20 kHz but is not limited thereto.

As such, according to the first embodiment of the present disclosure, when the internal temperature of the vehicle is less than or equal to the preset reference temperature, a driving signal of a specific frequency may be applied to the speaker unit to increase temperature of the speaker unit, thereby ensuring the performance and reliability of the speaker.

Figure 11:
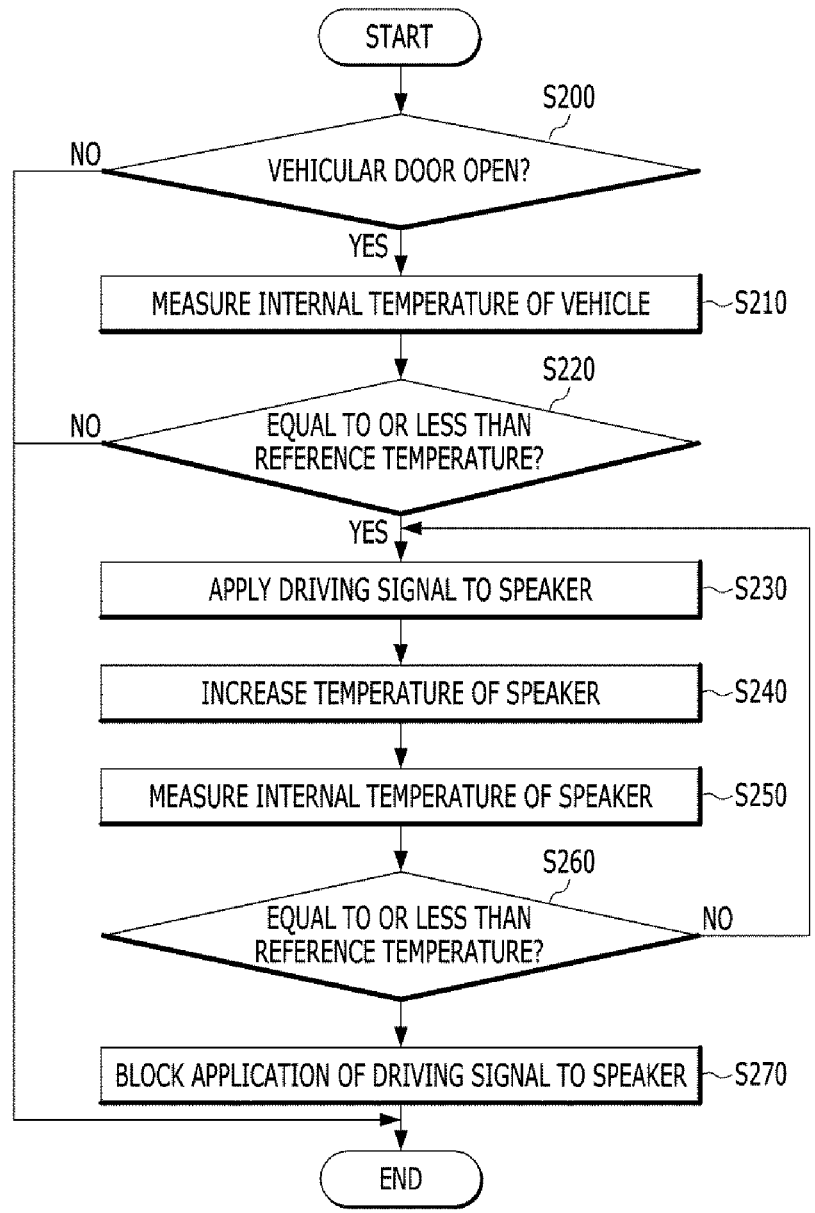
FIG. 11 is a flowchart for explanation of a method of controlling vehicular speaker temperature according to a second embodiment of the present disclosure.

FIG. 11 is a flowchart for explanation of a method of controlling vehicular speaker temperature according to a second embodiment of the present disclosure.

As shown in FIG. 11, the vehicular speaker temperature control device according to the present disclosure may first detect opening and closing states of a vehicular door (S200).

Then, when the vehicular door is in the opening state, the vehicular speaker temperature control device may measure internal temperature of the speaker unit (S210).

Then, the vehicular speaker temperature control device may determine whether the measured internal temperature of the speaker unit is less than or equal to the preset reference temperature (S220).

Here, the reference temperature may be room temperature and, in this case, the room temperature may be any one temperature in the range of about 10 degrees to about 30 degrees but is not limited thereto.

In addition, when the measured current internal temperature of the speaker unit is less than or equal to the preset reference temperature, the vehicular speaker temperature control device may apply a driving signal of a specific frequency to the speaker unit (S230) to increase the temperature of the speaker unit (S240).

Here, the specific frequency may be a frequency other than an audio frequency band.

This needs to be satisfied to prevent the driving frequency from being heard by a driver according to speaker temperature control.

For example, the driving frequency may any one of a frequency in the range of about 1 Hz to about 20 Hz and a frequency equal to or greater than about 20 kHz but is not limited thereto.

Then, the vehicular speaker temperature control device may measure the internal temperature of the speaker unit (S250).

Then, the vehicular speaker temperature control device may determine whether the internal temperature of the speaker unit is greater than the preset reference temperature (S260).

When the measured internal temperature of the speaker unit is greater than the preset reference temperature, the vehicular speaker temperature control device may block application of a driving signal of a specific frequency to the speaker unit (S270).

Here, the reference temperature may be room temperature and, in this case, the room temperature may be any one temperature in the range of about 10 degrees to about 30 degrees but is not limited thereto.

As such, according to the present disclosure, when internal temperature of the vehicular speaker is less than or equal to the preset reference temperature, a driving signal of a specific frequency may be applied to a speaker unit to increase temperature of the speaker unit, thereby ensuring the performance and reliability of the speaker.

Figure 12:
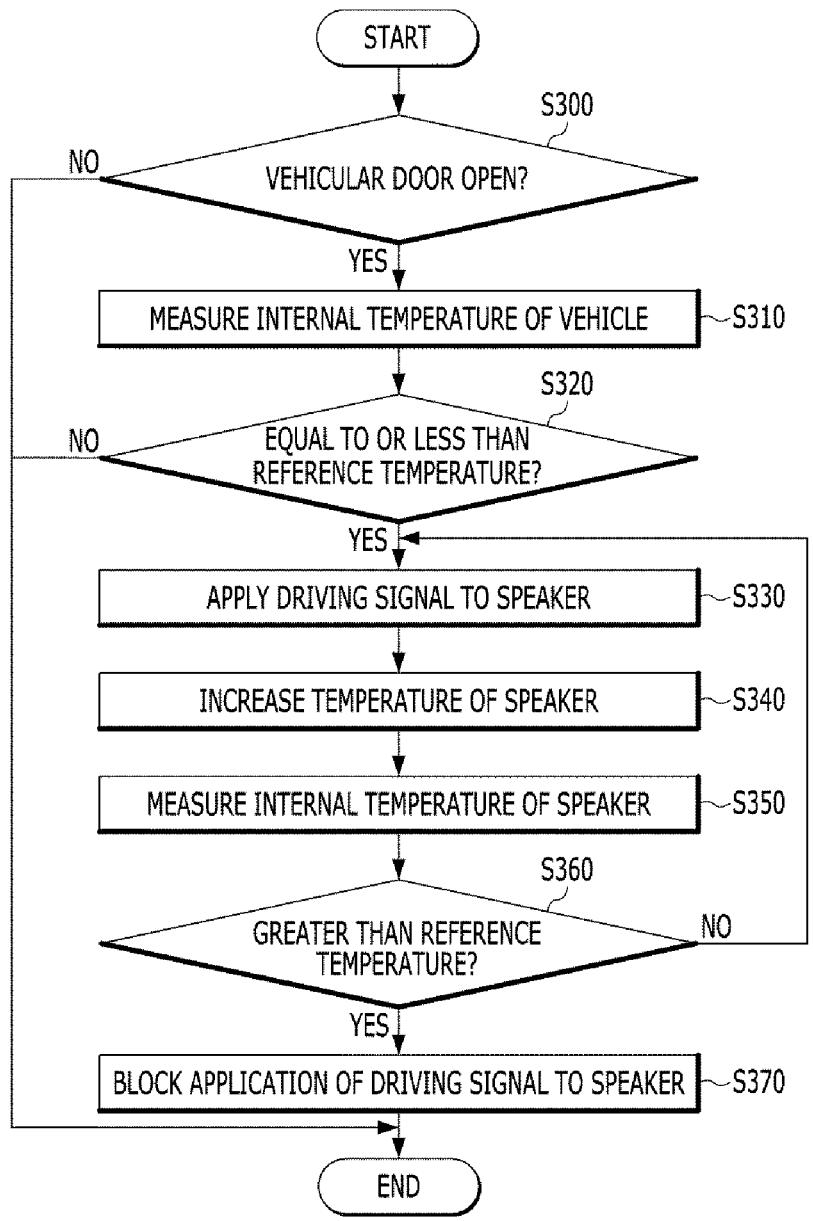
FIG. 12 is a flowchart for explanation of a method of controlling vehicular speaker temperature according to a third embodiment of the present disclosure.

FIG. 12 is a flowchart for explanation of a method of controlling vehicular speaker temperature according to a third embodiment of the present disclosure.

As shown in FIG. 12, the vehicular speaker temperature control device according to the present disclosure may first detect opening and closing states of a vehicular door (S300).

Then, when the vehicular door is in the opening state, the vehicular speaker temperature control device may measure internal temperature of the vehicle (S310).

Then, the vehicular speaker temperature control device may determine whether the measured internal temperature of the vehicle is less than or equal to the preset reference temperature (S320).

In addition, when the measured current internal temperature of the vehicle is less than or equal to the preset reference temperature, the vehicular speaker temperature control device may apply a driving signal of a specific frequency to the speaker unit (S330) to increase the temperature of the speaker unit (S340).

Here, an operation of increasing the temperature of the speaker unit may be performed via the following detailed operations.

When the measured current internal temperature of the vehicle is less than or equal to the preset reference temperature, the vehicular speaker temperature control device may calculate a temperature difference between the current internal temperature of the vehicle and the reference temperature.

Then, the vehicular speaker temperature control device may extract a driving frequency and driving time corresponding to the calculated temperature difference.

In addition, the vehicular speaker temperature control device may apply a driving signal corresponding to the extracted driving frequency to the speaker unit for the extracted driving time to increase the temperature of the speaker unit.

Here, the extracted driving time may be increased as the calculated temperature difference is increased and, the extracted driving frequency may be the same irrespective of a size of the calculated temperature difference.

For example, the extracted driving frequency may be any one of a frequency in the range of about 1 Hz to about 20 Hz and a frequency equal to or greater than about 20 kHz.

As such, the vehicular speaker temperature control device may extract the driving frequency and driving time corresponding to the temperature difference from the information table stored in the memory unit during extraction of the driving frequency and driving time corresponding to the calculated temperature difference.

Here, the information table may include the driving frequency and driving time corresponding to the temperature difference between the current temperature and the reference temperature.

For example, the driving time may be increased as the temperature difference is increased and the driving frequency may be the same as the temperature difference is increased.

Here, the driving frequency may be a frequency other than an audio frequency band.

This needs to be satisfied to prevent the driving frequency from being heard by a driver according to speaker temperature control.

For example, the driving frequency may any one of a frequency in the range of about 1 Hz to about 20 Hz and a frequency equal to or greater than about 20 kHz but is not limited thereto.

Then, the vehicular speaker temperature control device may measure internal temperature of the speaker unit (S350).

Then, the vehicular speaker temperature control device may determine whether the measured internal temperature of the speaker unit is greater than the preset reference temperature (S360).

In addition, when the measured internal temperature of the speaker unit is greater than the preset reference temperature, the vehicular speaker temperature control device may block application of a driving signal of a specific frequency to the speaker unit (S370).

As such, according to the third embodiment of the present disclosure, when the internal temperature of the vehicle or the internal temperature of the vehicular speaker is less than or equal to the preset reference temperature, the driving signal of the specific frequency may be applied to the speaker unit to increase temperature of the speaker unit, thereby accurately and precisely ensuring the performance and reliability of the speaker.

As such, according to the present disclosure, when the internal temperature of the vehicle or the internal temperature of the vehicular speaker is less than or equal to the preset reference temperature, the driving signal of the specific frequency may be applied to the speaker unit to increase temperature of the speaker unit, thereby ensuring the performance and reliability of the speaker.

According to the present disclosure, when the internal temperature of the vehicle or the internal temperature of the vehicular speaker is less than or equal to the preset reference temperature, the driving signal of the specific frequency may be applied to the speaker unit to increase temperature of the speaker unit, thereby accurately and precisely ensuring the performance and reliability of the speaker.

According to the present disclosure, when the internal temperature of the vehicle is less than or equal to the preset reference temperature, the driving signal of the specific frequency may be applied to the speaker unit to increase temperature of the speaker unit and, when temperature of the vehicular speaker is greater than the preset reference temperature, application of the driving signal of the specific frequency to the speaker unit may be terminated, thereby minimizing power consumption as well as accurately and precisely ensuring the performance and reliability of the speaker.

According to the present disclosure, when the vehicular door is open, the current temperature of the vehicle may be measured to minimize power consumption based on temperature sensing.

According to the present disclosure, a driving signal may be applied to a speaker unit using an information table including a driving frequency and driving time corresponding to a temperature difference between the measured current temperature and the reference temperature and, thus, speaker temperature control speed may be increased and a temperature control time may be minimized.

That is, according to the present disclosure, reduction in low-band sound quality of the speaker may be minimized at low temperature (about −5° C.) or less.

According to the present disclosure, a speaker dedicated temperature sensor may be used to accurately measure temperature of the speaker and to apply the sensor to the specification of a luxury car.

In addition, according to the present disclosure, when a temperature sensor attached to a vehicle and temperature information are used without use of the speaker dedicated sensor, a driving signal may be applied using an information table including a driving frequency and driving time corresponding to a temperature difference between the measured current temperature and the reference temperature, thereby minimizing reduction in the performance of the speaker in a low band without increase in costs and weight.

According to the aforementioned configured vehicular speaker temperature control device, method of controlling the device, and vehicle including the device related to embodiments of the present disclosure, when internal temperature of the vehicle or internal temperature of the vehicular speaker is less than or equal to the preset temperature, a driving signal of a specific frequency may be applied to a speaker unit to increase temperature of the speaker unit, thereby ensuring the performance and reliability of the speaker.

According to the present disclosure, when internal temperature of the vehicle and internal temperature of the vehicular speaker are less than or equal to the preset temperature, a driving signal of a specific frequency may be applied to a speaker unit to increase temperature of the speaker unit, thereby accurately and precisely ensuring the performance and reliability of the speaker.

According to the present disclosure, when internal temperature of the vehicle is less than or equal to the preset reference temperature, a driving signal of a specific frequency may be applied to a speaker unit to increase temperature of the speaker unit and, when temperature of the vehicular speaker is greater than the preset reference temperature, application of the driving signal of the specific frequency to the speaker unit may be terminated and, thus, the performance and reliability of the speaker may be accurately and precisely ensured and power consumption may also be minimized.

According to the present disclosure, the current temperature of a vehicle may be measured when a vehicular door is open and, thus, power consumption based on temperature sensing may be minimized.

In addition, according to the present disclosure, a driving signal may be applied to a speaker unit using an information table including a driving frequency and driving time corresponding to a temperature difference between the measured current temperature and the reference temperature and, thus, speaker temperature control speed may be increased and a temperature control time may be minimized.

That is, according to the present disclosure, reduction in low-band sound quality of the speaker may be minimized at low temperature (about −5° C.) or less.

According to the present disclosure, a speaker dedicated temperature sensor may be used to accurately measure temperature of the speaker and to apply the sensor to the specification of a luxury car.

In addition, according to the present disclosure, when a temperature sensor attached to a vehicle and temperature information are used without use of the speaker dedicated sensor, a driving signal may be applied using an information table including a driving frequency and driving time corresponding to a temperature difference between the measured current temperature and the reference temperature, thereby minimizing reduction in the performance of the speaker in a low band without increase in costs and weight.

It will be appreciated by persons skilled in the art that that the effects that could be achieved with the present disclosure are not limited to what has been particularly described hereinabove and other advantages of the present disclosure will be more clearly understood from the above detailed description taken in conjunction with the accompanying drawings.

The aforementioned present disclosure can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, carrier waves (e.g., transmission via the Internet), etc.

It will be apparent to those skilled in the art that various modifications and variations can be made in the present disclosure without departing from the spirit or scope of the disclosures. Thus, it is intended that the present disclosure cover the modifications and variations of this disclosure provided they come within the scope of the appended claims and their equivalents.

What is claimed is:

1. A vehicular speaker temperature control device comprising:
    a sensing unit configured to sense a temperature of a vehicle;
    an amplifier unit configured to amplify a sound of the vehicle;
    a speaker unit connected to the amplifier unit and configured to output the amplified sound; and
    a controller in operable communication with the sensing unit and the amplifier unit,
    wherein the controller is configured to receive a current temperature of the vehicle measured by the sensing unit, to determine whether the current temperature of the vehicle is less than or equal to a preset reference temperature, and when the current temperature of the vehicle is less than or equal to the preset reference temperature, to control operation of the amplifier unit so as to cause an increase in temperature of the speaker unit by applying a driving signal of a specific frequency to the speaker unit, and wherein the controller is configured to determine whether a door of the vehicle is open, and to control operation of the sensing unit so as to measure the current temperature of the vehicle when the door is open.

2. The vehicular speaker temperature control device of claim 1, wherein the sensing unit includes a temperature sensor installed in the vehicle that is configured to sense an internal temperature of the vehicle.

3. The vehicular speaker temperature control device of claim 2, wherein, when determining whether the current temperature of the vehicle is less than or equal to the preset reference temperature, the controller is configured to receive the a current internal temperature of the vehicle measured by the temperature sensor, and to compare the current internal temperature of the vehicle with the preset reference temperature to determine whether the current internal temperature of the vehicle is less than or equal to the preset reference temperature.

4. The vehicular speaker temperature control device of claim 1, wherein the sensing unit includes a temperature sensor installed in the speaker unit that is configured to sense an internal temperature of the speaker unit.

5. The vehicular speaker temperature control device of claim 4, wherein, when determining whether the current temperature of the vehicle is less than or equal to the preset reference temperature, the controller is configured to receive a current internal temperature of the speaker unit measured by the temperature sensor, and to compare the current internal temperature of the speaker unit with the preset reference temperature to determine whether the current internal temperature of the speaker unit is less than or equal to the preset reference temperature.

6. The vehicular speaker temperature control device of claim 1, wherein the sensing unit includes:
a first temperature sensor installed in the vehicle that is configured to sense an internal temperature of the vehicle; and
a second temperature sensor installed in the speaker unit of the vehicle that is configured to sense an internal temperature of the speaker unit.

7. The vehicular speaker temperature control device of claim 6, wherein:
when determining whether the current temperature of the vehicle is less than or equal to the preset reference temperature, the controller is configured to receive a current internal temperature of the speaker unit measured by the first temperature sensor, and to compare the current internal temperature of the speaker unit with the preset first reference temperature to determine whether the current internal temperature of the speaker unit is less than or equal to the preset first reference temperature, and
when the current internal temperature of the speaker unit is less than or equal to the preset first reference temperature, the controller is configured to receive the current internal temperature of the speaker unit measured by the second temperature sensor, and to compare the current internal temperature of the speaker unit with the preset second reference temperature to determine whether the current internal temperature of the speaker unit is less than or equal to the preset second reference temperature.

8. The vehicular speaker temperature control device of claim 1, wherein the preset reference temperature corresponds to room temperature.

9. The vehicular speaker temperature control device of claim 1, wherein, when controlling operation of the amplifier unit, the controller is configured to calculate a temperature difference between the current temperature of the vehicle and the preset reference temperature when the current temperature of the vehicle is less than or equal to the preset reference temperature, to extract a driving frequency and driving time corresponding to the calculated temperature difference, to generate a driving signal based on the extracted driving frequency and driving time, and to control the operation of the amplifier unit by applying the generated driving signal to the speaker unit.

10. The vehicular speaker temperature control device of claim 9, wherein the driving frequency is a frequency other than an audio frequency band.

11. The vehicular speaker temperature control device of claim 1, wherein the speaker unit includes:
a frame forming an outer appearance of the speaker unit;
a voice coil configured to generate heat upon receiving a driving signal from the amplifier unit;
a cone paper connected to the voice coil and disposed at a location in the frame spaced apart therefrom at a constant interval;
an edge connecting the cone paper to an end of the frame; and
a damper connecting the frame to the voice coil.

12. The vehicular speaker temperature control device of claim 11, wherein, when heat is generated in the voice coil, the speaker unit is configured to transmit the generated heat to the damper and to the edge.

13. The vehicular speaker temperature control device of claim 11, wherein the speaker unit further includes a temperature sensor that is electrically connected to the damper and the edge and configured to sense a temperature of the damper and the edge.

14. The vehicular speaker temperature control device of claim 1, wherein, when determining whether the current temperature of the vehicle is less than or equal to the preset reference temperature, the controller is configured to control the operation of the amplifier unit so as to prevent the driving signal of the specific frequency from being applied to the speaker unit when the current temperature of the vehicle is greater than the preset reference temperature.

15. A vehicular speaker temperature control method comprising:
detecting, by a controller, whether a door of a vehicle is in an open state or a closed state;
when the door is in the open state, measuring, by a sensing unit, a current internal temperature of the vehicle;
determining, by the controller, whether the current internal temperature of the vehicle is less than or equal to a preset reference temperature; and
when the current internal temperature of the vehicle is less than or equal to the preset reference temperature, controlling, by the controller, operation of an amplifier unit so as to cause an increase in temperature of a speaker unit connected to the amplifier unit by applying a driving signal of a specific frequency to the speaker unit.

16. The vehicular speaker temperature control method of claim 15, further comprising:

when the current internal temperature of the vehicle is less than or equal to the preset reference temperature, calculating, by the controller, a temperature difference between the current internal temperature of the vehicle and the preset reference temperature;

extracting, by the controller, a driving frequency and driving time corresponding to the calculated temperature difference;

generating, by the controller, a driving signal based on the extracted driving frequency and driving time; and controlling, by the controller, the operation of the amplifier unit by applying the generated driving signal to the speaker unit.

17. A vehicular speaker temperature control method comprising:

detecting, by a controller, whether a door of a vehicle is in an open state or a closed state;

when the door is in the open state, measuring, by a sensing unit, an internal temperature of the speaker unit;

determining, by the controller, whether the internal temperature of the speaker unit is less than or equal to preset reference temperature;

when the internal temperature of the speaker unit is less than or equal to the preset reference temperature, controlling, by the controller, operation of an amplifier unit so as to cause an increase in temperature of a speaker unit connected to the amplifier unit by applying a driving signal of a specific frequency to the speaker unit;

measuring, by the sensing unit, an internal temperature of the speaker unit;

determining, by the controller, whether the internal temperature of the speaker unit is greater than the preset reference temperature; and when the internal temperature of the speaker unit is greater than the preset reference temperature, preventing, by the controller, the driving signal of the specific frequency from being applied to the speaker unit.

18. A vehicular speaker temperature control method comprising:

detecting, by a controller, whether a door of a vehicle is in an open state or a closed state;

when the door is in the open state, measuring, by a sensing unit, a current internal temperature of the vehicle;

determining, by the controller, whether the current internal temperature of the vehicle is less than or equal to a preset reference temperature;

when the current internal temperature of the vehicle is less than or equal to the preset reference temperature, controlling, by the controller, operation of an amplifier unit so as to cause an increase in temperature of a speaker unit connected to the amplifier unit by applying a driving signal of a specific frequency to the speaker unit;

measuring, by the sensing unit, an internal temperature of the speaker unit;

determining, by the controller, whether the internal temperature of the speaker unit is greater than the preset reference temperature; and when the internal temperature of the speaker unit is greater than the preset reference temperature, preventing, by the controller, the driving signal of the specific frequency from being applied to the speaker unit.

19. The vehicular speaker temperature control method of claim 18, further comprising:

when the current internal temperature of the vehicle is less than or equal to the preset reference temperature, calculating, by the controller, a temperature difference between the current internal temperature of the vehicle and the preset reference temperature;

extracting, by the controller, a driving frequency and driving time corresponding to the calculated temperature difference;

generating, by the controller, a driving signal based on the extracted driving frequency and driving time; and controlling, by the controller, the operation of the amplifier unit by applying the generated driving signal to the speaker unit.

* * * * *